April 18, 1950        A. H. RUSSELL        2,504,881
LEAK CLAMP
Filed March 24, 1947
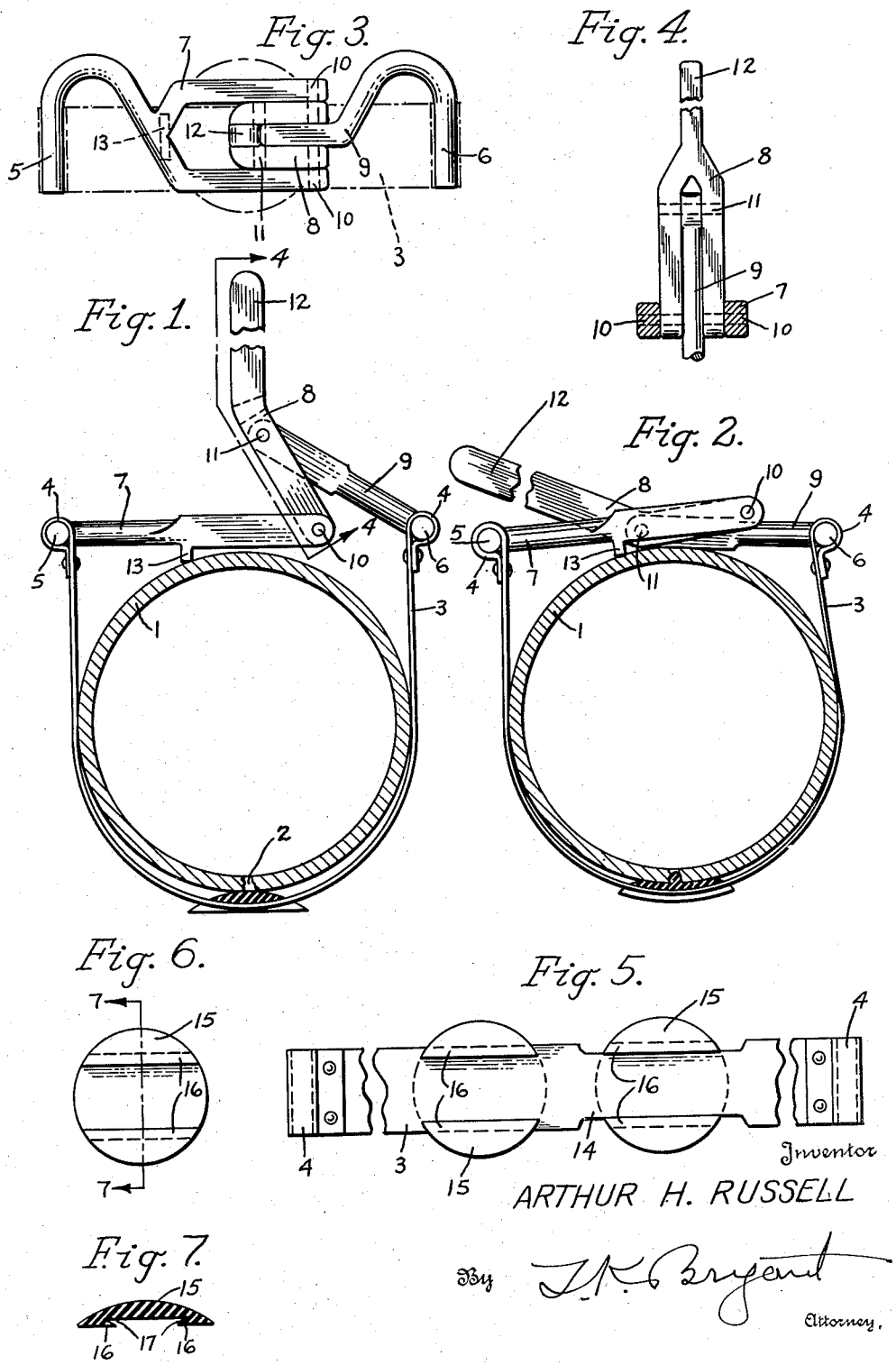
ARTHUR H. RUSSELL Patented Apr. 18, 1950

2,504,881

UNITED STATES PATENT OFFICE 2,504,881

LEAK CLAMP

Arthur H. Russell, Fort Worth, Tex.

Application March 24, 1947, Serial No. 736,880

5 Claims. (Cl. 138—99)

This invention relates to means for quickly stopping leaks in conduits or pipes preparatory to making permanent repairs.

It is customary, in stopping pit-leaks in oil, gas and water lines, to cut a small piece of gasket material, punch holes in it on opposite sides, fasten a piece of wire in each hole, then tie the wire around the pipe with the gasket material over the pit-hole. A metal patch having the contour of the pipe line is then made and placed over the gasket material, and several U-clamps are drawn over the metal patch and around the pipe to press the patch against the pipe, compressing the gasket and stopping the leak. This may take from one-half to several hours depending on conditions under which the repair is made. In the meantime, until the patch is drawn tightly against the pipe, the contents of the pipe line are escaping in the immediate vicinity of the workmen, slowing their progress considerably, and if the contents of the pipe line are inflammable, a great hazard is encountered. The pipe lines are usually buried under the ground several feet. Before this method of repair can be made, an excavation of sufficient size to accommodate several workmen must usually be made, the contents of the pipe line leaking all the time this is being done. Often men are overcome working under these conditions.

It is an object of this invention to provide a clamp which may be quickly applied to pipes or conduits, having small clearance around them, to promptly and completely stop a leak therein while permanent repairs are being prepared.

Another object is to provide a flexible metal band having toggle linkage attachable to its ends, and moulded rubber plugs attachable to its inner surface, for application to pipe or conduit leaks, by passing the band around said pipe or conduit, placing the rubber plug over the leak, and drawing the ends of said band tightly toward each other by means of said toggle linkage, which is self-locking in the band-tight position.

Another object is to provide means for pressing a rubber plug against a pit-leak in a pipe or conduit, having small clearance around it, for quickly and completely stopping said leak temporarily, until permanent repairs can be made without the hazards of continuing leakage of the contents of the pipe or conduit in the vicinity of the repair work.

Another object is to construct a flexible metal band with looped ends for slipping over a pair of pins of a toggle linkage for drawing said ends toward each other to tighten said band around a pipe, said toggle linkage being self-locking in the band-tight position.

Another object is to make the above defined band slightly narrower for a portion of its length near the middle, and provide rubber plugs having inturned grooves formed by parallel shoulders extending from opposite sides at the back of said plugs, whereby a plug may be slipped over said narrower portion of said band and slid over to an adjacent wider portion thereof to be held in position thereon while applying it to a leak in said pipe under said band to completely stop said leak without any delay so that permanent repairs may then be made without interruption or discomfort by continuing leakage of the contents of said pipe through said leak.

Other and more specific objects will become apparent in the following detailed description of one form of construction which may be made in accordance with the present invention, having reference to the accompanying drawing, wherein:

Fig. 1 is a sectional view of a pipe having a leak, to which the device of the present invention is being applied, Fig. 2 is the same view wherein the device is in a band-tightened position, with the leak stopped and the toggle linkage in self-locked position, Fig. 3 is a top view of the toggle linkage as shown in Fig. 1, Fig. 4 is a sectional view of the toggle linkage taken on the line 4—4 of Fig. 1, Fig. 5 is an enlarged detail bottom or outer side view of the band showing how the rubber plugs are attached thereto, one plug being shown slipped over the narrower portion of the band, and another plug in attached position after being slid from said first position onto the wider adjacent portion of the band, and Figs. 6 and 7 are back and sectional views of one of the moulded rubber plugs to be used in connection with the present device.

In the form of the device illustrating the present invention, it is applied to a pipe 1 to stop the leak 2 therein promptly and completely so that more permanent repairs may be launched without being hampered by a continuing leakage.

The flexible metal band 3 is looped at its ends to form eyelet bearings 4 for the parallel pins 5 and 6 of the toggle linkage made up of three links 7, 8 and 9, arranged and shaped as shown. The pins 5 and 6 are formed on the outer ends of links 7 and 9, respectively, the inner ends of these links being pivoted by pins 10 and 11 respectively to spaced points along the third link 8. This link has an operating arm 12 extending upwardly therefrom, whereby the links 7 and 9 with their pins 5 and 6 may be drawn toward each other, the adjacent ends of links 7 and 8 being forked so as to nest with each other and with the end of link 9, so as to enable the movement of the linkage to the locked position shown in Fig. 2, wherein the pin 11 has been moved past the axis of link 7. Link 7 has a lug 13 for cooperation with the periphery of the pipe to hold the inner end of the link away from the pipe far enough to ensure the possibility of moving the pin 11 to the position above defined, and still provide space for the inner end of link 9 to fall below pins 10 without hitting the pipe, whereby a locked position is obtained. To loosen and withdraw the clamp, all that is necessary to do is to move the arm 12 in the opposite direction, when the toggle linkage can be separated from the band by pulling it axially of the pipe to move the pins 5 and 6 out of the eyelet bearings 4.

The band 3 is made narrower for a portion of its length 14 near its middle. The rubber plugs 15 may be moulded in circular form, as shown, with parallel shoulders 16 on opposite sides of the back of the plug to form inwardly turned grooves 17 which will fit over the edges of the wider portion of band 3. The shoulders themselves are spaced so as to slip over the narrower portion, from which position the plug may be slid over the adjacent wider portion of the band, where it is to be held for application over the leak by properly positioning the band around the pipe before applying the toggle linkage to the band eyelets 4.

Thus, when a repair crew finds a leak, they need only to make a clearance around the leaky section of the pipe large enough to pass the band around the pipe and properly locate the plug over the leak. The band is then clamped, providing an immediate and complete stoppage of the leak, so that the crew may go ahead unmolested in preparing for a permanent repair. Not bothered by the continuing leakage of the contents of the pipe, which might add hazard to discomfort if the contents are inflammable, the crew may continue their work at ease and do a much better job of repair in a shorter time without any discomfort.

Obvious modifications in dimensions, form and arrangement to suit different circumstances may be made without departing from the spirit and scope of the present invention, as defined in the appended claims.

What is claimed is:

1. A leak clamp for a pit-leak in a pipe or conduit, comprising a flexible band, means for mounting a leak plug of resilient material on the inner face of said band, and quickly applied means for manually drawing the ends of said band tightly toward each other around said pipe or conduit with the plug covering said leak, said manual means being self-locking in said tightened position and releasable by reverse operation, the ends of said band being looped and said manual means having axial pins at its ends turned axially of said conduit in the same direction for slipping into said loops preliminary to drawing them toward each other.

2. A leak clamp as defined in claim 1, wherein said manual means consists of three links pivotally joined in series between said loops, said pins being formed integrally on the outer ends of the two links respectively, the middle link having an arm extending outwardly from one of its ends for operating said linkage to bring said outer links toward each other until said middle link just passes the tightest or center position when it is doubled over on the other two links, whereby it will lock said linkage against loosening until manually reversed past said center position.

3. A leak clamp as defined in claim 2, wherein the link closest to the periphery of said pipe or conduit during the tightening operation has a lug for cooperation with the periphery to hold the end of said link away from said pipe sufficiently to assure that said past center position of the middle link might be reached before the other end link hits the pipe.

4. A leak clamp for a pit-leak in a pipe or conduit, comprising a flexible band, means for mounting a leak plug of resilient material on the inner face of said band, and quickly applied means for manually drawing the ends of said band tightly toward each other around said pipe or conduit with the plug covering said leak, said manual means being self-locking in said tightened position and releasable by reverse operation, said means for mounting the leak plug on the band consisting of a reduced width for a portion of said band and parallel shoulders on the back of said plug spaced to slip over said reduced width, and forming inwardly turned grooves therein to fit over the normal width of said band by sliding said plug from said reduced width portion to said normally wide portion of said band.

5. Moulded rubber leak plugs having parallel spaced shoulders on the back thereof forming inwardly turned grooves for mounting over the edges of a strip of material of corresponding width.

ARTHUR H. RUSSELL.

REFERENCES CITED

The following references are of record in the file of this patent:

UNITED STATES PATENTS

| Number | Name | Date |
| --- | --- | --- |
| 712,019 | Thomas et al | Oct. 28, 1902 |
| 1,242,950 | Knauss | Oct. 16, 1917 |

FOREIGN PATENTS

| Number | Country | Date |
| --- | --- | --- |
| 372,259 | France | Feb. 15, 1907 |